(12) United States Patent
Stephan (10) Patent No.: US 7,487,141 B1
(45) Date of Patent: Feb. 3, 2009

(54) SKIPPING PATTERN FOR AN INVERTED INDEX

(75) Inventor: Wolfgang Stephan, Heidelberg (DE)

(73) Assignee: SAP AG, Walldorf, DE (US)

( * ) Notice: Subject to any disclaimer, the term of this patent is extended or adjusted under 35 U.S.C. 154(b) by 499 days.

(21) Appl. No.: 10/601,258

(22) Filed: Jun. 19, 2003

(51) Int. Cl.
*G06F 7/00* (2006.01)
*G06F 17/30* (2006.01)

(52) U.S. Cl. .................................... 707/3; 707/4; 707/5

(58) Field of Classification Search ............. 707/3, 707/200, 4, 5; 395/603, 497, 500
See application file for complete search history.

(56) References Cited

U.S. PATENT DOCUMENTS

| | | | | |
|---|---|---|---|---|
| 3,406,380 | A * | 10/1968 | Bradley et al. ............. | 710/5 |
| 5,539,899 | A * | 7/1996 | Huynh et al. ............. | 711/171 |
| 5,838,950 | A * | 11/1998 | Young et al. ............. | 703/21 |
| 6,439,783 | B1 * | 8/2002 | Antoshenkov ............. | 707/3 |
| 2004/0064512 | A1 * | 4/2004 | Arora et al. ............. | 709/206 |
| 2004/0243560 | A1 * | 12/2004 | Broder et al. ............. | 707/3 |

OTHER PUBLICATIONS

Moffat et al. (Moffat hereinafter) (Non-Patent Literature: "Self-Indexing Inverted Files for Fast Text Retrieval"; Alistar Moffat, and Justin Zobel; Feb. 1994, 1994 Australian Database Conference, and 1994 IEEE Conference on Data Engineering).*

Alistair Moffat & Justin Zobel, "Self-Indexing Inverted Files for Fast Text Retrieval", Feb. 1994.

D. Bahle, H.E. Williams, J. Zobel, "Efficient Phrase Querying with an Auxiliary Index" 2001, 7 pages.

Christof Monz & Maarten de Rijke, "Inverted Index Construction", Spring 2002.

F. Scholer, H.E. Williams, J. Yiannis, J. Zobel, "Compression of Inverted Indexes for Fast Query Evaluation" 2001, 8 pages.

* cited by examiner

*Primary Examiner*—Jean M Corrielus
*Assistant Examiner*—Giovanna Colan
(74) *Attorney, Agent, or Firm*—Mintz, Levin, Cohn, Ferris, Glovsky and Popeo P.C.

(57) ABSTRACT

Indexing documents is accomplished by generating an inverted index for a collection of one or more documents, each document including one or more index terms. The inverted index includes an inverted list for each index term in the collection of documents. One or more inverted lists include a quantity of postings that exceeds a value x, a skip entry after the $x^{th}$ posting, and one or more additional skip entries thereafter at intervals of every $y^{th}$ posting. The value x is such that at least a majority of the index terms occur in x documents or fewer, and the value y is not equal to the value x.

46 Claims, 7 Drawing Sheets

Inverted List for OPTICIAN $\quad <d, f, [o_1 \dots o_f]>$ $\underbrace{<150,1,[16]>}_{P_1} <381,2,[8,17]> <523,1,[17]> \dots \underbrace{<718,3,[4,9,15]>}_{P_{160}}$

Preliminary Results $\quad (d_{pr1}, \dots, d_{pr160})$ $\underbrace{(150}_{d_{pr1}}, \underbrace{381}_{d_{pr2}}, \underbrace{523}_{d_{pr3}}, \dots \underbrace{723)}_{d_{pr160}}$

SKIPPING PATTERN FOR AN INVERTED INDEX

BACKGROUND

The following disclosure relates to techniques for indexing terms included in a collection of one or more documents.

Search engines can be used to locate keywords or phrases in a collection of documents. A search query typically includes one or more keywords, and can be formed, for example, using Boolean logic, or as a phrase, such as by including the search terms in quotation marks. Examples of commonly used Boolean operators include AND, OR and NOT. A phrase query requires that two or more terms be located in a particular order within a document. Proximity operators used in Boolean logic search queries require two or more search terms to conform to a predefined proximal relationship, for example, a search query may specify that two search terms must occur within five words of each other in a document.

A search engine can evaluate a search query using an inverted index for the collection of documents. An inverted index includes a vocabulary of terms occurring in the documents and an inverted list for each index term. The vocabulary of terms can be arranged in a data structure, such as a B-tree. An inverted list includes one or more postings, where each posting identifies a document in the collection, a frequency of the index term in the identified document, and a list of offsets, which identify positions at which the index term appears in the identified document. For example, a posting in an inverted list for index term t may be configured as follows:

$$<d, f_{d,t}, [o_1, \ldots o_{fd,t}]>$$

where d identifies a document in the collection, f is the frequency of occurrences of the term t in the document d, and $o_1$ through $o_{fd,t}$ are offsets identifying positions of the term t in the documented.

A search engine evaluating a query traverses the inverted lists for index terms included in the query. For example, evaluating a query formed using Boolean logic may require traversing more than one list depending on the operator, such as OR (the union of component lists), AND (an intersection of component lists), SUM (the union of component lists), or a proximity operator (an intersection of component lists).

Evaluating a phrase query can be achieved by combining the inverted lists for the query terms to identify matching documents. Alternatively, an auxiliary index can be used, for example, an inverted index that indexes common terms and nextword pairs. 'Stopping' is a technique for evaluating search queries including common terms, where common terms are identified as stopwords and ignored when evaluating a search query.

'Skipping' is a technique to improve query evaluation performance by including synchronization points (skip entries) in a compressed inverted list, to provide additional locations at which decompressing can commence. Skipping allows a relevant portion of a compressed list to be identified and decompressed, without decompressing the entire list.

SUMMARY

The following describes apparatus and techniques relating to indexing terms included in a collection of one or more documents, for example, by using a pattern for including skip entries in inverted lists associated with corresponding index terms included in the collection of documents.

In general, in one aspect, these apparatus and techniques indexing documents in a collection of documents, where each document includes one or more index terms. A value x is determined such that at least a majority of the index terms occur in x documents or fewer, and a value y is determined, where y is not equal to x. An inverted index is generated for the collection of documents, the inverted index including an inverted list for each of the index terms. Each inverted list includes at least one posting and, if the number of postings exceeds x, further includes a skip entry after the $x^{th}$ posting and one or more skip entries thereafter at intervals of every $y^{th}$ posting.

In general, in another aspect, these apparatus and techniques feature an inverted index for a collection of documents, each document including one or more index terms, the inverted index including an inverted list for each index term in the collection of documents. One or more inverted lists include a quantity of postings that exceeds a value x, a skip entry after the $x^{th}$ posting, and one or more additional skip entries thereafter at intervals of every $y^{th}$ posting. The value x is such that at least a majority of the index terms occur in x documents or fewer, and the value y is not equal to the value x.

Implementations can include one or more of the following features. Each posting can include a document identifier identifying a document in the collection of documents, a position identifier identifying a position of the index term in the document, and a frequency of the index term occurring in the document. A skip entry can identify the smallest document number of documents included in the postings immediately following the skip entry in the inverted list. Alternatively, a skip entry can identify the largest document number of documents included in the postings immediately preceding the skip entry in the inverted list. The skip entry can further include information to locate the next skip entry in the inverted list.

Substantially all of the index terms can occur in x documents or fewer, for example, approximately 80 to 90% of the index terms occur in x documents or fewer. Y can be less than x. X can be in the range of 256 to 512 and y can be in the range of 128 to 256. The collection of documents can include one or more binary files, data tables, source code files, text documents or combinations thereof. The inverted index can be compressed. For each inverted list having a number of postings exceeds x, a skip entry can be included before the first posting in the inverted list and/or after the last posting in the inverted list.

In general, in another aspect, these apparatus techniques feature indexing documents. A collection of documents is received, each document including one or more index terms. A value x is determined, wherein at least a majority of the index terms occur in x documents or fewer and x is in the range of 256 to 512. A value y is determined, wherein y is not equal to the value x and is in the range of 128 to 256. An inverted index is generated for the collection of documents. The inverted index includes an inverted list for each of the index terms, each inverted list including at least one posting and, if the number of postings exceeds x, further including a skip entry after the $x^{th}$ posting and one or more skip entries thereafter at intervals of every $y^{th}$ posting.

Implementations can include one or more of the following features. Each posting can include a document identifier identifying a document in the collection of documents, a position identifier identifying a position of the index term in the document, and a frequency of the index term occurring in the document. A skip entry can identify the smallest document number of documents included in the postings immediately following the skip entry in the inverted list, or can identify the largest document number of documents included in the postings immediately preceding the skip entry in the inverted list. The skip entry can further includes information to locate the next skip entry in the inverted list. Substantially all of the index terms can occur in x documents or fewer, for example, approximately 80 to 90% of the index terms occur in x documents or fewer. For each inverted list having a number of postings exceeds x, a skip entry can be included before the first posting in the inverted list and/or after the last posting in the inverted list.

Implementations can realize one or more of the following advantages. A balance can be achieved between the performance benefits of including skip entries in an inverted index, and the drawbacks associated with the increased inverted index size, resulting from including skip entries. Including skip entries in the inverted lists for the frequently occurring terms, provides performance benefits in terms of more efficient query evaluation. Decompression of irrelevant portions of an inverted list can be avoided, for example, when evaluating a query including two or more index terms. Reducing the amount of decompression needed tends to speed up query evaluation, and requires less memory to store the inverted lists retrieved for a query evaluation, allowing more inverted lists to be stored in a temporary memory store, for example, a cache. The more inverted lists that can be stored in a cache, can mean less disk accesses during query evaluation, resulting in improved evaluation performance.

An increase in the inverted index size, due to the inclusion of skip entries, may be minimized by including skip entries only in lists exceeding a predetermined threshold number of postings. Although most of the inverted lists in the inverted index may not have skip entries, performance is not significantly affected because these lists typically are relatively small.

The details of one or more embodiments are set forth in the accompanying drawings and the description below. Other features and advantages will be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The apparatus and techniques described here relate to an inverted index for index terms included in a collection of one or more documents. As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

An inverted index generated for a collection of documents includes a vocabulary of terms occurring in the documents and an inverted list for each index term. An inverted index can be compressed to reduce the size of the index, thus requiring less storage space. A compressed inverted index can be transferred more quickly from disk to memory, reducing the time needed to evaluate a query. Some integer compression schemes include Elias gamma and delta coding and Golomb-Rice coding. Compression schemes can be bitwise or bytewise, such as a bytewise scheme described by F. Scholer, et al., in *Compression of Inverted Indexes for Fast Query Evaluation*, Proceedings of the ACM-SIGIR Conference on Research and Development in Information Retrieval, Tampere, Finland, August 2002. Other compression techniques can also be used.

Decompression of inverted lists during query evaluation can cause a bottleneck in performance, especially if frequent terms are included in the query. If a query includes more than one term, for example, a Boolean query using the AND operator, some decompression can be avoided by including skip entries or synchronization points at a predetermined interval, for example, every y postings, in the inverted list or in a separate additional index including the skip entries.

Figure 1:
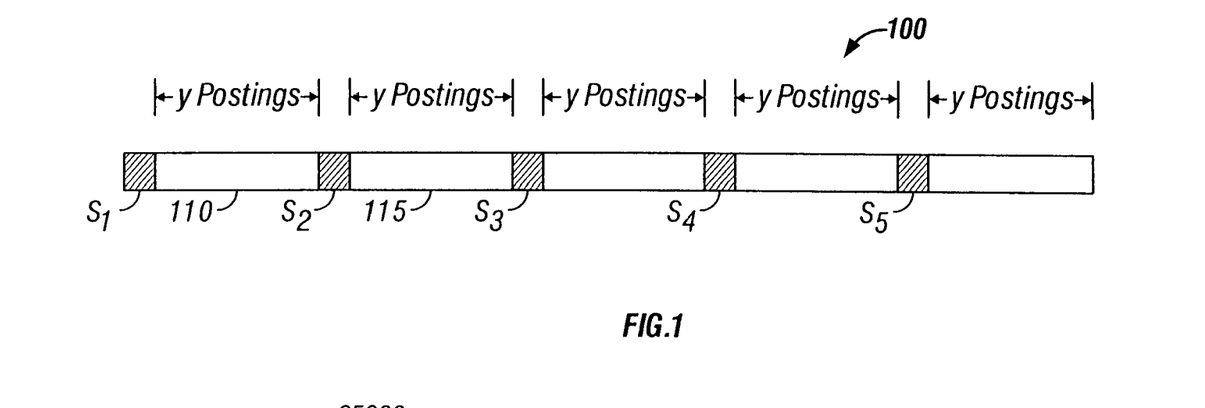
FIG. 1 is a schematic representation of an inverted list including skip entries.

FIG. 1 shows an example of a conventional inverted list 100 including skip entries, $S_1$ through $S_5$, every y postings. A skip entry, for example $S_1$, can be configured as follows:

$<<d_1, a_2>>$ where $d_1$ is a number identifying the lowest document number in the first block of postings 110, and $a_2$ is the address of the second skip entry $S_2$. The address $a_2$ from the first skip entry $S_1$ can be used to locate the second skip entry $S_2$, which is similarly configured to identify the lowest document number, $d_2$, in the second block of postings 115, and the address, $a_3$, of the third skip entry $S_3$, and so on.

By decoding the first and second skip entries, the range of document numbers included in the first block of postings 110 is known. That is, the document numbers range from $d_1$ to less than $d_2$. When traversing an inverted list to determine whether a posting is included for a specific document (e.g., when evaluating the second index term in a two-term search query), the skip entries can be decoded until a block of postings is identified that would include the posting, if such a posting is included in the inverted list. The identified block can then be traversed and decompressed to determine whether or not such a posting exists in the inverted list. In this manner, skip entries can be used to avoid unnecessarily decompressing large portions of an inverted list.

Although substantial performance improvements can be achieved by the skipping scheme described above, for example, by a factor of 4-6 for a 5-10 term query, the skip entries significantly increase the size of the index. An inverted index file can grow approximately 6-25%, depending on the interval size, y, chosen. By contrast, the skipping pattern described below provides performance improvements, while substantially improving the space requirement for an inverted index including skip entries.

Figure 2:
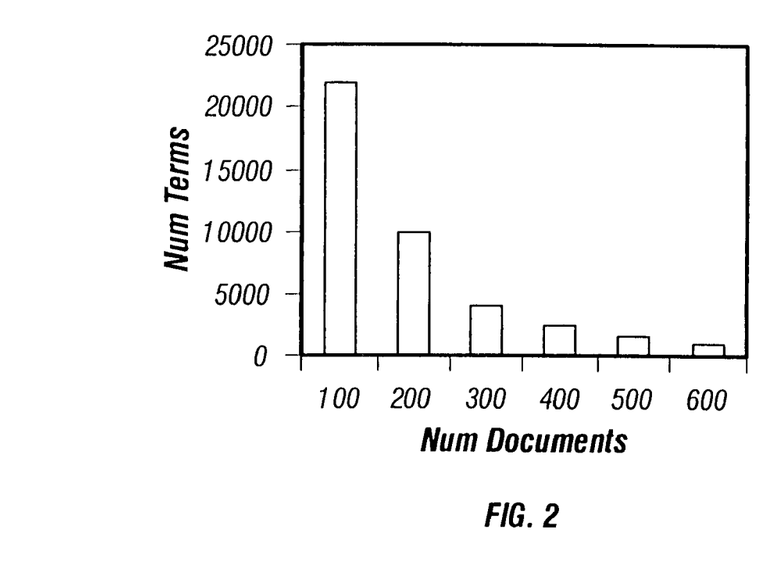
FIG. 2 is a schematic representation of an inverted list including skip entries according to the skip pattern.

An analysis of index term frequency distribution of a typical index reveals that at least a majority of the terms, and in this example most (e.g., more than 90%) of the terms, occur in less than a threshold number of documents (i.e., x documents). For example, referring to the bar graph shown in FIG. 2, in a document collection including 600 documents most of the index terms occur in 400 documents or fewer.

Figure 3:
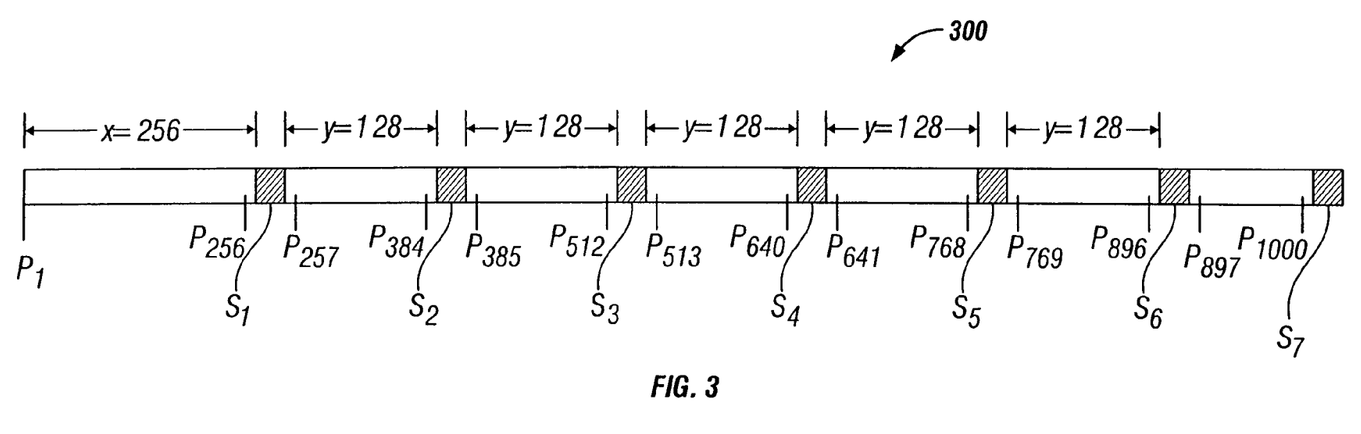
FIG. 3 is a flowchart showing a process for building an inverted index including skip entries according to the skip pattern.

Referring to FIG. 3, a skipping pattern for an inverted list 300 is shown, including skip entries that start after x postings and occur thereafter every y postings, where x and y can be integers. That is, since at least a majority of the index terms occur in less than x documents, and skip entries do not commence until after x postings, at least a majority of the inverted lists will not include skip entries. Although these index terms contribute most to the overall index size, because each individual inverted list is relatively small, decompressing some of these smaller lists while evaluating a query does not significantly hamper performance. The more frequently occurring index terms, for example, common terms such as, "the", "of" and "a", or other terms that occur with a high frequency in a particular collections of documents (e.g. the term California may occur with high frequency in a collection of documents about the state of California), will occur in more than x documents, and accordingly will include at least some skip entries in their corresponding inverted list.

Using a skip pattern as shown in FIG. 3, a balance can be achieved between index size and performance. That is, the larger inverted lists in the index include skip entries, thus improving evaluation performance, while a substantial number of the inverted lists do not include skip entries, thus minimizing the increase in index size due to skip entries.

Figure 4:
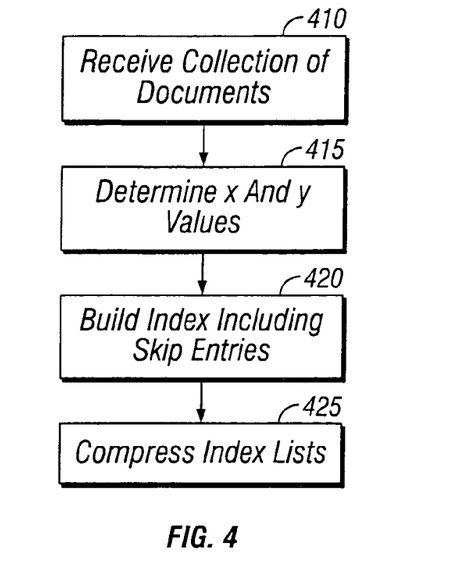
FIG. 4 is a schematic representation of an inverted list.

Referring to FIG. 4, a flowchart describing a process for building an inverted index including skip entries according to the above described skip pattern is shown. Upon receiving a collection of documents from which to build an inverted index (Step 410), the x and y values must be set (Step 415).

The x and y values are selected to achieve the balance referred to above, and can be determined empirically. Factors such as the document collection being indexed, the performance requirements, available disk, and others, can be taken into consideration when determining x and y. For example, the inverted index size and search performance can be measured as functions of x and y. Consider a standard text collection, such as the TREC collection of documents available from the National Institute of Standards and Technology (NIST) at http://trec.nist.gov. By way of illustrative example, to index approximately 2 gigabytes of HTML documents from the TREC text collection, under the constraint that the inverted index file not increase by more than 2% due to skip entries, the x value can be in the range of 256 to 512 and they value in the range of 128 to 256. Alternatively, x and y can be determined by a mathematical analysis, taking into account parameters, such as those listed above.

The inverted index is then built, and skip entries are included in the inverted lists including more than x postings, commencing after the $x^{th}$ posting and occurring thereafter at intervals of every $y^{th}$ posting (Step 420). The inverted index can then be compressed according to a compression scheme as described above (Step 425).

By way of an illustrative example, the performance benefits of using a compressed inverted index, built according to the skip pattern described herein, to evaluate a search query is set forth below and shown in FIGS. 5A through 8B. In this example, for simplicity, the search query includes two index terms, although any number of index terms can be included in the search query. The query is formed using Boolean logic as follows:

optician AND California

That is, the request is for all documents in a collection of documents that include both of the words optician and California. For example, the requestor may be searching for all opticians located in California. The total number of documents in the collection is 1000, identified as $d_1$ through $d_{1000}$. Accordingly, if an index term occurred in each of the 1000 documents, the inverted index could be schematically represented as shown in FIG. 3, which includes postings $P_1$ through $P_{1000}$: one posting for every document in the collection. The inverted index has an x value of 256 and a y value of 128. That is, skip entries commence after the $x^{th}$ posting and occur at intervals of y postings thereafter.

Figure 5A:
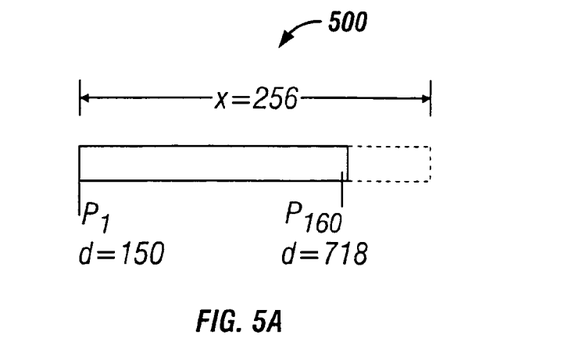
FIGS. 5A and 5B are schematic representations of inverted lists including skip entries according to the skip pattern.
Figure 6A:
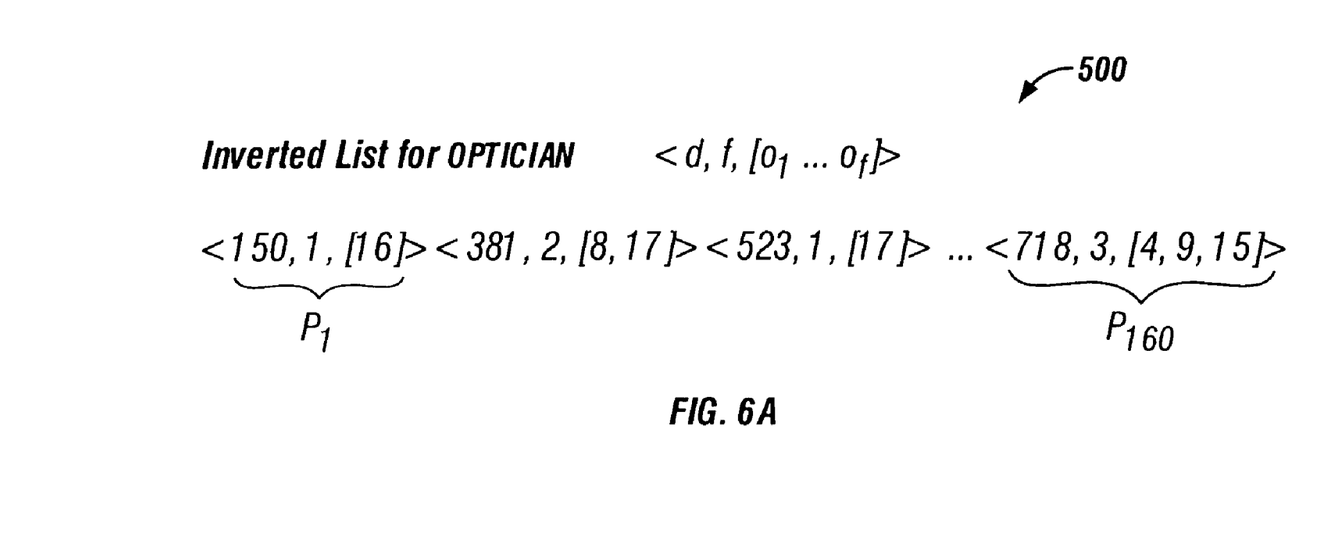
FIG. 6A is a representation of an excerpt from an inverted list for the term optician.

A schematic representation of an inverted list for the index term optician is shown in FIG. 5A. The index term optician occurs in 160 of the 1000 documents, which is illustrated by the inclusion of 160 postings in the inverted list 500 (i.e., postings $P_1$ through $P_{160}$). The index term optician first occurs in the $150^{th}$ document, $d_{150}$, and last occurs in the $718^{th}$ document, $d_{718}$. Posting $P_1$ includes the document, frequency, and offset information for $d_{150}$, and posting $P_{160}$ includes the corresponding information for $d_{718}$. FIG. 6A shows a representation of some of the postings from the inverted list 500 for the index term optician, in particular, postings $P_1$-$P_3$ and $P_{160}$.

Figure 5B:
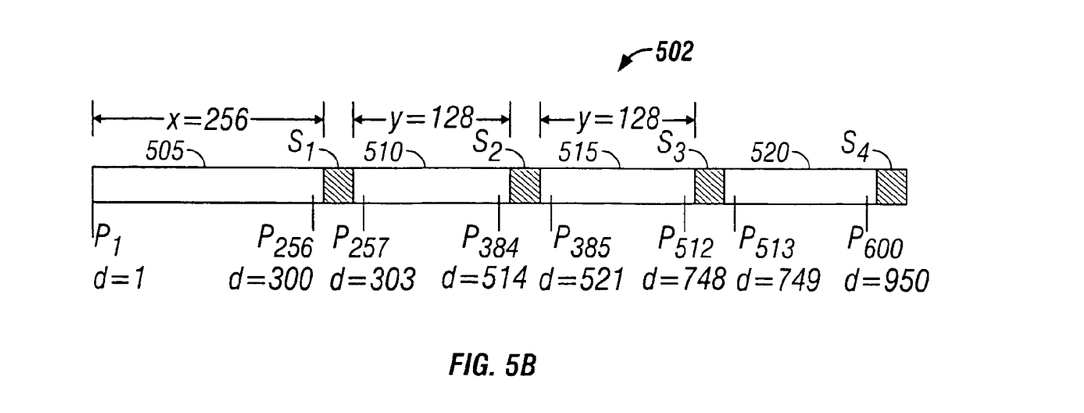
Figure 7:
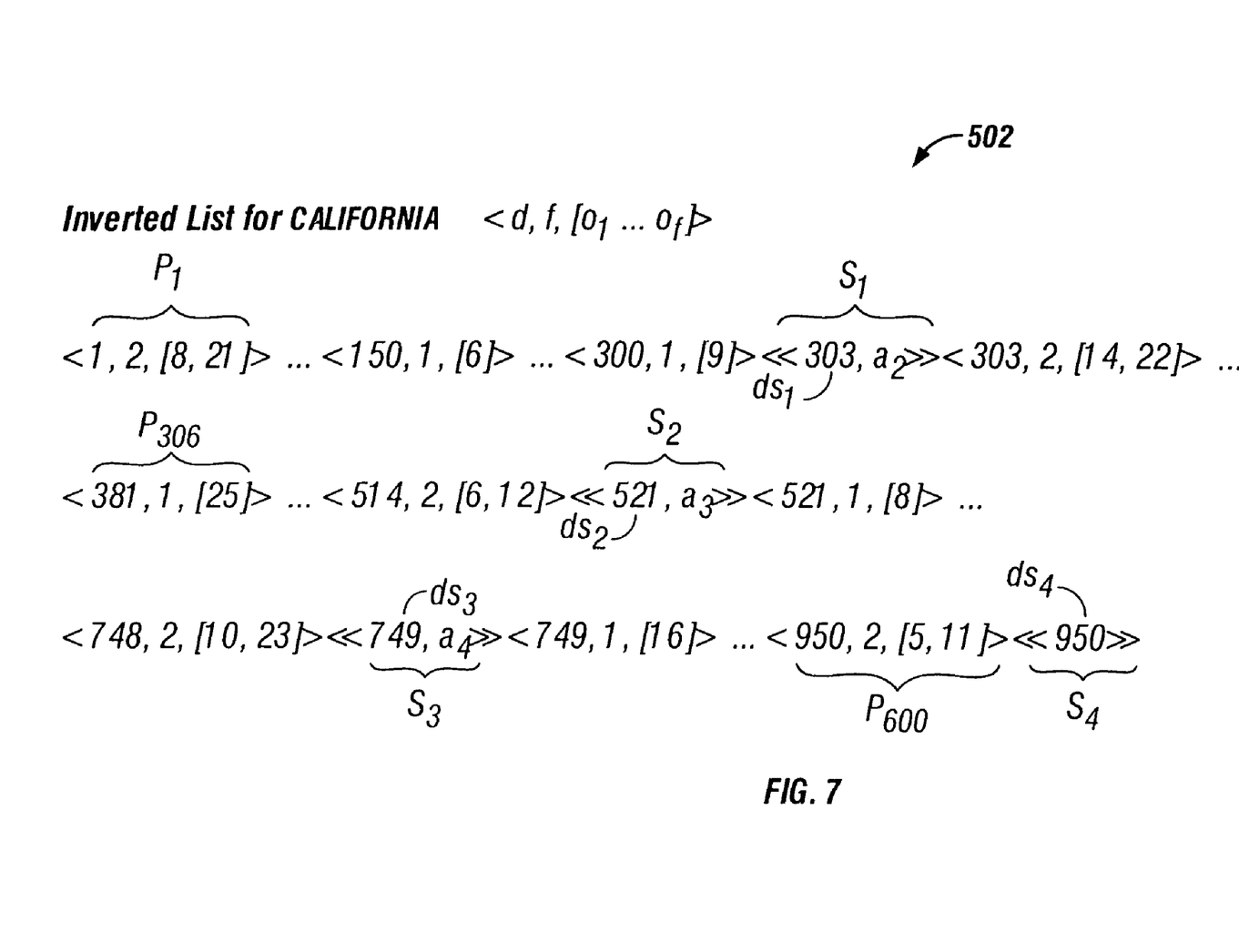
FIG. 7 is a representation of an excerpt from an inverted list for the term California.

FIG. 5B shows a schematic representation of an inverted list for the index term California, and FIG. 7 shows a representation of some of the postings from the inverted list 502. The index term California occurs in 600 of the 1000 documents, and the inverted list 502 includes 600 postings. The index term California first occurs in the $1^{st}$ document, $d_1$, and last occurs in the $950^{th}$ document, $d_{950}$. Posting $P_1$ includes the document, frequency and offset information for $d_1$, and posting $P_{600}$ includes the corresponding information for $d_{950}$. Postings in the inverted list 502 exceed the x value of 256, and accordingly skip entries are included in the list. The skip entries occur every 128 postings starting after the $256^{th}$ posting, and a total of four skip entries, $S_1$ through $S_4$, are included. In this example, the skip entries are configured as document-address pairs as follows:

TABLE 1

| Skip entry | Skip entry contents |
|---|---|
| $S_1$ | <<303, $a_2$>> |
| $S_2$ | <<521, $a_3$>> |
| $S_3$ | <<749, $a_4$>> |
| $S_4$ | <<950>> |

Each skip entry includes a number identifying the lowest document number in the skip entry's respective block 510-520 of postings, and an address for the next skip entry. The final skip entry $S_4$ only includes a document number, since there is no subsequent skip entry address, and occurs at the end of the inverted list. Because the final skip entry always occurs at the end of the inverted list, it can be less than y postings from the previous skip entry. It is apparent from the skip entries that the first block of postings 505 preceding $S_1$ includes postings for documents between 1 and 302, the second block of postings 510 following $S_1$ includes postings for documents between 303 and 520, the third block of postings 515 following $S_2$ includes postings for documents between 521 and 748, and the final block of postings 520 following $S_3$ includes postings for documents between 749 and 950.

Figure 8A:
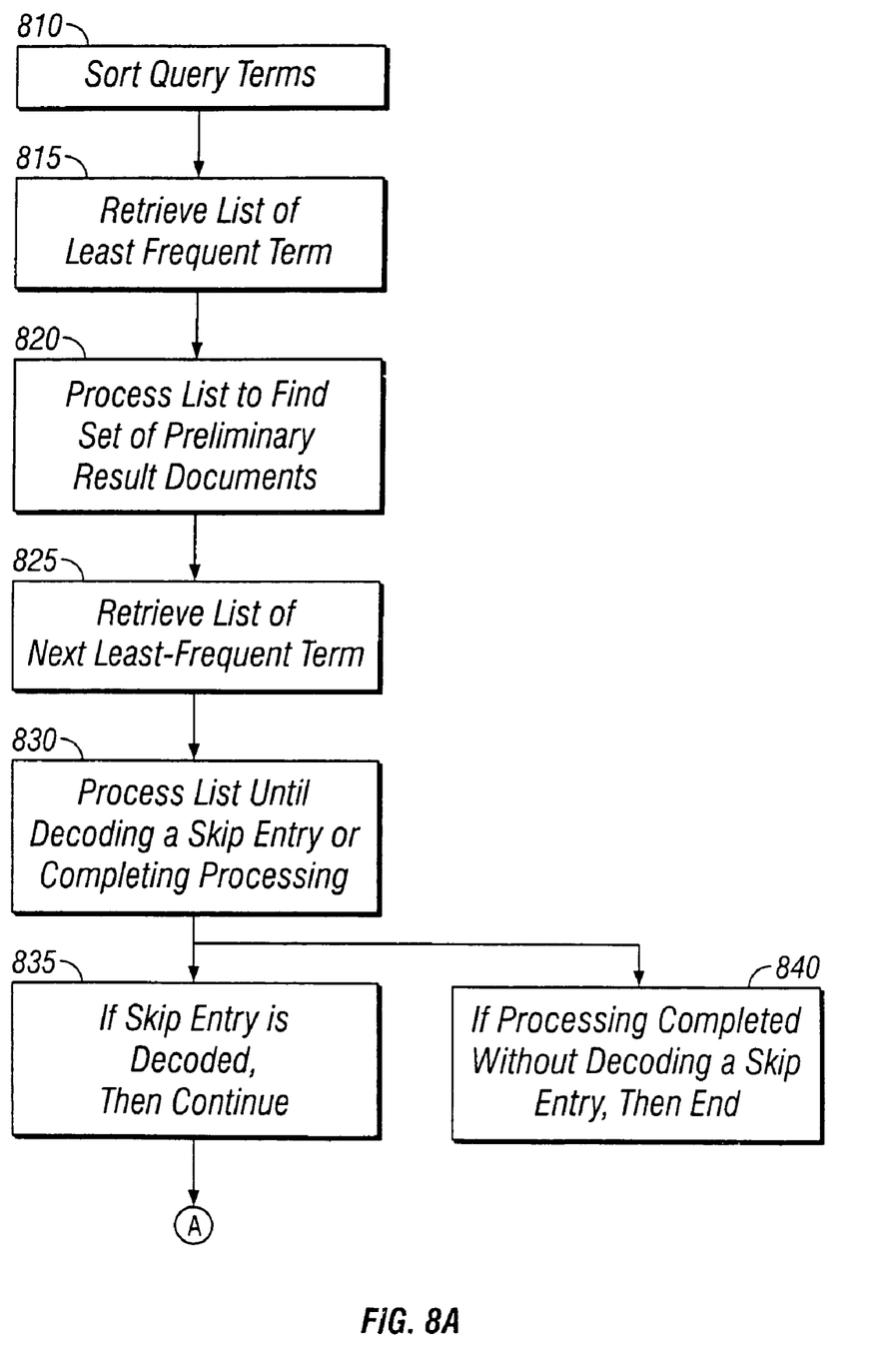
FIGS. 8A and 8B are flowcharts showing a process for evaluating a search query.
Figure 8B:
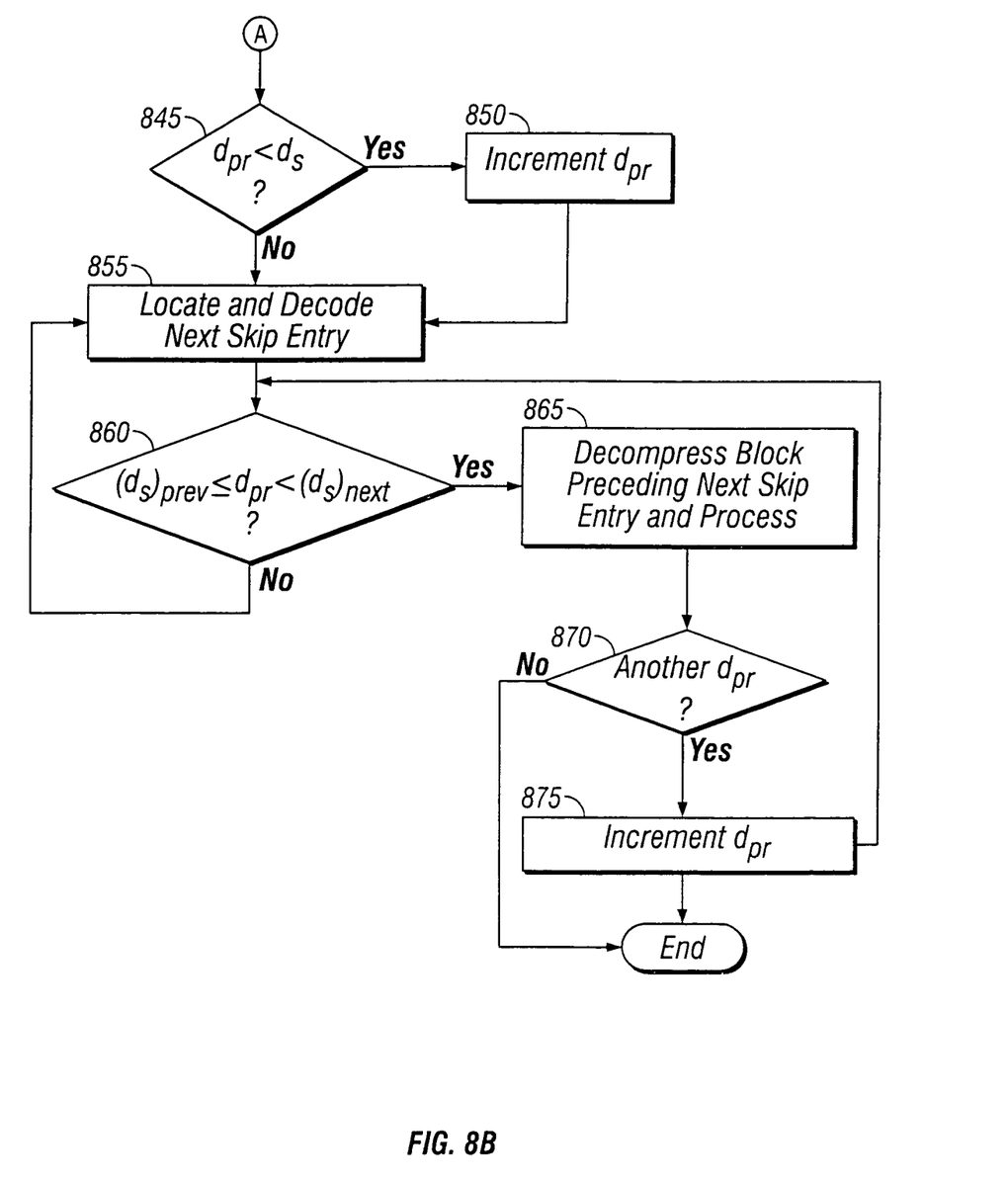

Referring to FIGS. 8A and 8B, a flowchart describing a process for evaluating a query using an inverted index including skip entries according to the skip pattern is shown. The search query terms are sorted from the least frequently occurring to the most frequently occurring (Step 810). In this implementation, the 'most frequently occurring' term is the term occurring in the most number of documents. However, in an alternative implementation, the 'most frequently occurring' term can be the term occurring with the most frequency in total, regardless of the number of documents in which the term occurs. The inverted list for the least frequent term is retrieved, which can require a disk access and transfer from disk to memory, if the inverted list is not already in memory or in a cache (Step 815).

Figure 6B:
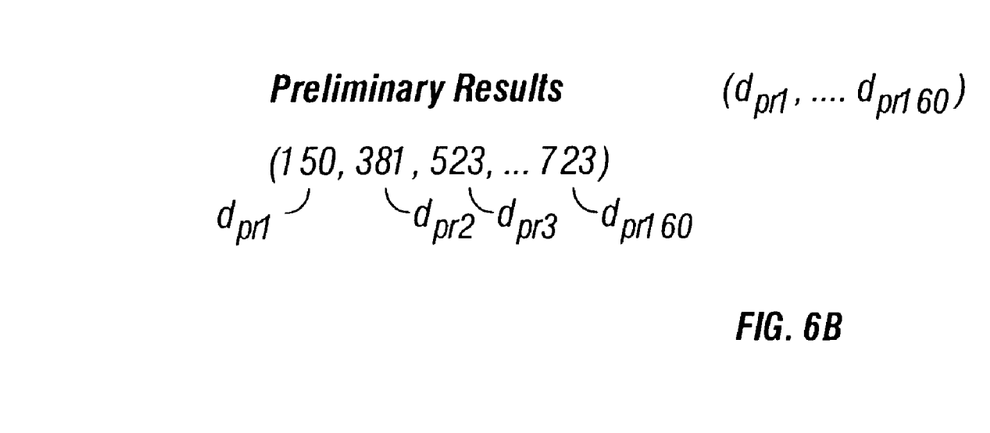
FIG. 6B is a representation of an excerpt from a set of preliminary results for the search query "optician AND California".

In this example, the term optician occurs less frequently than the term California, and accordingly the inverted list for optician is retrieved and decompressed to determine a preliminary set of search results (Step 820). That is, a set of documents ($d_{pr}$) including the term optician is identified. Ultimately, the search results will be a subset of the set of preliminary results, i.e., those documents including both the terms optician and California. FIG. 6B shows a representation of some of the preliminary results.

The compressed list for the next least-frequent term is retrieved (Step 825). In this example there are only two search terms, and accordingly the compressed list for the term California is retrieved, which again may require a disk access and transfer from disk to memory. The goal at this stage is to find the union of the optician and California inverted lists. The postings in the inverted list for California are processed by decompressing each posting one-by-one to determine whether a match exists for each of the preliminary results (i.e., the subset of documents in the collection that include the term optician which was determined in Step 820) (Step 830). For each document, $d_{pr}$, in the preliminary results, a match is sought in the inverted list for California, which is traversed to identify matches. The set of identified matches forms the set of results to the search query.

If the inverted list for California does not include skip entries, then processing will be completed without decoding a skip entry (Step 840). However, in this example, the inverted list for California does include skip entries. Accordingly, as the postings are decompressed during the processing step, eventually a skip entry will be decoded (i.e., after the $x^{th}$ posting). It should be noted that even though the inverted list for California includes skip entries, processing (i.e., searching for matches to the preliminary results) can be completed before a skip entry is decompressed, that is, if all matches occur in the first x postings of the inverted list for California.

In the present example, the postings in the California inverted list 502 are decompressed to search for a match to $d_{pr1}$ that is, to determine if the term California occurs in $d_{150}$. In the example, a match is found in $P_{12}$ of the inverted list 502. Processing continues to determine if a match exists in the California inverted list 502 for the next preliminary result, $d_{pr2}$, which is $d_{381}$. As postings in the California inverted list 502 are being decompressed in search for a match to $d_{381}$, a skip entry, $S_1$, is decoded (Step 835). The document value included in the skip entry, $d_{S1}$, is compared to the preliminary result being processed, $d_{pr2}$ (Step 845).

If the preliminary result, $d_{pr2}$, was less than the skip entry document number, $d_{S1}$ ('No' branch of decision step 845), then it would be known that if a match was to be found in the inverted list 502, it would have been found in the first block 505 of postings, and since it had not been found, there is not a match. In that instance, the preliminary result is incremented to the next preliminary result (Step 850), and the address, $a_1$, included in the first skip entry $S_1$ is used to locate and decode the next skip entry, $S_2$. The next preliminary result is compared to $d_{S1}$ and $d_{S2}$ to determine whether a match, if one exists, can be located in the second block 510 of postings, or whether to skip ahead to a subsequent block of postings before continuing to decompress and process the postings.

In this example, the preliminary result, $d_{381}$, is greater than the skip entry document number, $d_{303}$, ('Yes' branch of decision step 845), indicating that a match to the preliminary result can exist in the second or subsequent blocks of postings. The address, $a_1$, from the first skip entry $S_1$ is used to locate and decode the next skip entry $S_2$ (Step 855).

The preliminary result $d_{pr2}$ is compared to the document values included in both the first skip entry, $d_{S1}$, and the second skip entry, $d_{S2}$ (Step 860). If the preliminary result document $d_{pr2}$ is less than the document value included in the next skip entry $d_{S2}$ and greater than or equal to the document value in the first skip entry $d_{S1}$ ('Yes' branch of decision step 860), then if a match is to occur, it will occur in the second block 510 of postings. However, if the preliminary result document $d_{pr2}$ does not fall between $d_{S1}$ and $d_{S2}$, then the address $a_2$ from the second skip entry $S_2$ is used to locate and decode the next skip entry $d_{S3}$ (Step 855). Skip entries are located and decoded until the comparison step 860 finds a block of postings in which a match to the preliminary result will be found, if a match exists.

In the present example, the preliminary result document, $d_{381}$, is less than the document value included in the second skip entry, $d_{521}$, and greater than the document value included in the first skip entry, $d_{303}$. Accordingly, if a match to the preliminary result $d_{pr2}$ exists in the California inverted list 502, it will occur in the second block 510 of postings. The postings in the second block 510 are decompressed one-by-one until either a match is found or the entire second block 510 has been traversed. In the example, a match to $d_{pr2}$ is located at posting $P_{306}$ which includes a document value 381.

If there is a next preliminary result, like in this example ('Yes' branch of decision step 870), then $d_{pr}$ is incremented (Step 875), and the process loops back to Step 860, to determine whether a match to $d_{pr3}$, if it exists, can be found in the second block 510 of postings. In the example, $d_{pr3}$ has a value of $d_{523}$. When compared to the values of $d_{S1}$ ($d_{303}$) and $d_{S2}$ ($d_{521}$), the document value of the preliminary result $d_{pr3}$ does not fall within the range, and accordingly, a match will not be found in the second block 510 of postings ('No' branch of decision step 860).

Using the address $a_2$ from the second skip entry $S_2$; the third skip entry $S_3$ is located and decoded (Step 855). The preliminary result is compared to the document values included in $S_2$ and $S_3$, in this case $d_{S2}$, and $d_{749}$, and it is determined that if a match exists for $d_{523}$ that it will occur in the third block 515 of postings. Any postings in the second block 510 that had not already been decompressed are skipped over, and decompressing recommences starting with the first posting in the third block 515.

The process continues until the preliminary results, i.e., the subset of documents including the term optician, have been completely traversed to identify matches to documents including the term California. It should be noted that if a match for the last preliminary result $d_{723}$ exists, it occurs in the third block 515 of postings, and accordingly, the final block 520 of postings does not have to be decompressed.

Certain performance benefits of using the skipping pattern are illustrated in the above example. For example, at least a portion of the second block 505 of postings and all of the fourth block 520 of postings never had to be decompressed.

Additionally, when traversing the inverted list 502 for California to determine whether a match existed for each $d_{pr}$, for example $d_{pr3}$, the entire list 502 did not have to be traversed, but only one block of postings or fewer. Reducing the amount of decompression required and the amount of the list that must be traversed with respect to each preliminary result ($d_{pr}$) improves performance efficiency. An additional benefit to reduced decompression, is the reduction in memory space required to store the inverted list 502 once it has been retrieved from disk.

Other implementations are possible. For example, a skip entry can include a number identifying the highest document number in the block of postings immediately preceding the skip entry, rather than the lowest document number in the block of postings immediately following the skip entry. Postings can be stored as d-gaps, that is, the document numbers can be stored as differences. The skip entries can be similarly coded, with both the document numbers and addresses being stored as differences.

Redundant information can be excluded from an inverted list. For example, if a skip entry includes a number identifying the lowest document number in the block of postings immediately following the skip entry, then the document number included in the first posting following the skip entry is redundant and can be eliminated, thereby further reducing the size the inverted list.

In other implementations, a skip entry can be included at the beginning of the inverted list and/or a skip entry can be omitted from the end of the inverted list. In another implementation, a value z can be determined, where after one or more skip entries are included after y postings, one or more skip entries are included in the list after every z postings.

Various implementations of the apparatus and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also know as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor.

Although only a few embodiments have been described in detail above, other modifications are possible. Portions of this disclosure discuss building an inverted index including skip entries arranged according to a skip pattern to allow for improved performance, while minimizing the increase in index size due to the inclusion of skip entries. The logic flows depicted in FIGS. 4, 8A and 8B do not require the particular order shown, or sequential order, to achieve desirable results. In certain implementations, multitasking and parallel processing may be preferable. Other embodiments may be within the scope of the following claims.

What is claimed is:

1. A method for indexing documents in a collection of documents using skip entries, each document comprising one or more index terms, the method comprising:

determining a first value x representative of a first location for inserting a first skip entry in an inverted index, such that x is determined as an integer corresponding to a quantity of documents including at least a majority of the index terms, wherein the first value x representing the first location for inserting the first skip entry is not the first posting of the inverted index, wherein x is an integer in a first range of 256 to 512;

determining a second value y, where y does not exceed x, the second value y determined as an integer and representative of a second location for inserting a second skip entry in the inverted index, wherein y does not equal x, such that the first and second skip entries are provided at different intervals, wherein y is an integer in a second range of 128 to 256;

generating the inverted index for the collection of documents, the inverted index including an inverted list for each of the index terms, each inverted list including at least one posting and, if the number of postings exceeds x, further including the first skip entry inserted after the Xth posting and one or more second skip entries inserted thereafter at intervals of every yth posting;

wherein:

the at least one posting includes a document identifier identifying a document in the collection of documents;

the first and second skip entries including a document identifier that is included in a boundary posting of a block of postings immediately adjacent to the skip entry in the inverted list, where a block of postings includes postings having document identifiers ranging from a lower to an upper value and where a boundary posting is a posting having a document identifier of either the lower or the upper value.

2. The method of claim 1, wherein each posting further includes a position identifier identifying a position of the index term in the document, and a frequency of the index term occurring in the document.

3. The method of claim 1, wherein the boundary posting includes a document identifier having the lower value in the range of values and the block of postings follow the first skip entry in the inverted list.

4. The method of claim 3, wherein the first skip entry further includes information to locate the next skip entry in the inverted list.

5. The method of claim 1, wherein the boundary posting includes a document identifier having the higher value in the range of values and the block of postings precede the first skip entry in the inverted list.

6. The method claim 5, wherein the first skip entry further includes information to locate the next skip entry in the inverted list.

7. The method of claim 1, wherein x is selected from a first range of 256 to 512 and y is selected from a second range of 128 to 256, wherein y is not selected to have the same value as x.

8. The method of claim 1, wherein the collection of one or more documents includes one or more binary files, data tables, source code files, text documents or combinations thereof.

9. The method of claim 1, further comprising:
compressing the inverted index.

10. The method of claim 1, wherein substantially all of the index terms occur in x documents or fewer.

11. The method of claim 10, wherein at least approximately 80% of the index terms occur in x documents.

12. The method of claim 1, wherein for each inverted list, if the number of postings exceeds x, further including a skip entry before the first posting in the inverted list.

13. The method of claim 1, wherein for each inverted list, if the number of postings exceeds x, further including a skip entry after the last posting in the inverted list.

14. A method for indexing documents using skip entries, the method comprising:
- receiving a collection of documents, each document comprising one or more index terms;
- determining a first value x representative of a first location for inserting a first skip entry in an inverted index, wherein at least a majority of the index terms occur within x documents and x is an integer in a first range of 256 to 512, wherein the first value x representing the first location for inserting the first skip entry is not the first posting of the inverted index;
- determining a second value y representative of a second location for inserting a second skip entry in the inverted index, wherein y does not exceed the value x and is an integer in a second range of 128 to 256, wherein y does not equal x, such that the first and second skip entries are provided at different intervals; and
- generating the inverted index for the collection of documents, the inverted index including an inverted list for each of the index terms, each inverted list including at least one posting and, if the number of postings exceeds x, further including the first skip entry inserted after the $x^{th}$, posting and one or more second skip entries inserted thereafter at intervals of every $y^{th}$ posting;

wherein:
- the at least one posting includes a document identifier identifying a document in the collection of documents;
- the first and second skip entries include a document identifier that is included in a boundary posting of a block of postings immediately adjacent to the skip entry in the inverted list, where a block of postings includes postings having document identifiers ranging from a lower to an upper value and where a boundary posting is a posting having a document identifier of either the lower or the upper value.

15. The method of claim 14, wherein each posting further includes a position identifier identifying a position of the index term in the document, and a frequency of the index term occurring in the document.

16. The method of claim 14, wherein the boundary posting includes a document identifier having the lower value in the range of values and the block of postings follows the first skip entry in the inverted list.

17. The method of claim 16, wherein the first skip entry further includes information to locate the next skip entry in the inverted list.

18. The method of claim 14, wherein the boundary posting includes a document identifier having the higher value in the range of values and the block of postings precede the first skip entry in the inverted list.

19. The method claim 14, wherein the first skip entry further includes information to locate the next skip entry in the inverted list.

20. The method of claim 14, wherein substantially all of the index terms occur in x documents or fewer.

21. The method of claim 20, wherein approximately 80 to 90% of the index terms occur in x documents or fewer.

22. The method of claim 14, wherein for each inverted list, if the number of postings exceeds x, further including a skip entry before the first posting in the inverted list.

23. The method of claim 14, wherein for each inverted list, if the number of postings exceeds x, further including a skip entry after the last posting in the inverted list.

24. An article comprising a machine-readable medium storing instructions operable to cause one or more machines to perform operations comprising:
- determining a first value x representative of a first location for inserting a first skip entry in an inverted index, such that x is determined as an integer corresponding to a quantity of documents including at least a majority of the index terms, wherein the first value x representing the first location for inserting the first skip entry is not the first posting of the inverted index, wherein x is an integer in a first range of 256 to 512;
- determining a second value y, where y does not exceed x, the second value y determined as an integer and representative of a second location for inserting a second skip entry in the inverted index, wherein y is an integer in a second range of 128 to 256;
- generating the inverted index for the collection of documents, the inverted index including an inverted list for each of the index terms, each inverted list including at least one posting and, if the number of postings exceeds x, further including the first skip entry inserted after the xth posting and one or more second skip entries inserted thereafter at intervals of every yth posting, wherein y does not equal x, such that the first and second skip entries are provided at different intervals;

wherein:
- the at least one posting includes a document identifier identifying a document in the collection of documents;
- the first and second skip entries including a document identifier that is included in a boundary posting of a block of postings immediately adjacent to the skip entry in the inverted list, where a block of postings includes postings having document identifiers ranging from a lower to an upper value and where a boundary posting is a posting having a document identifier of either the lower or the upper value.

25. The article of claim 24, wherein each posting further includes a position identifier identifying a position of the index term in the document, and a frequency of the index term occurring in the document.

26. The article of claim 24, wherein the boundary posting includes a document identifier having the lower value in the range of values and the block of postings follow the first skip entry in the inverted list.

27. The article of claim 26, wherein the first skip entry further includes information to locate the next skip entry in the inverted list.

28. The article of claim 24, wherein the boundary posting includes a document identifier having the higher value in the range of values and the block of postings precede the first skip entry in the inverted list.

29. The article of claim 28, wherein the first skip entry further includes information to locate the next skip entry in the inverted list.

30. The article of claim 24, wherein x is selected from a first range of 256 to 512 and y selected from a second range of 128 to 256, wherein y is not selected to have the same value as x.

31. The article of claim 24, wherein the collection of one or more documents includes one or more binary files, data tables, source code files, text documents or combinations thereof.

32. The article of claim 24, further comprising instructions operable to cause one or more machines to perform operations comprising:
compressing the inverted index.

33. The article of claim 24, wherein substantially all of the index terms occur in x documents or fewer.

34. The article of claim 33, wherein at least approximately 80% of the index terms occur in x documents.

35. The article of claim 24, wherein for each inverted list, if the number of postings exceeds x, further including a skip entry before the first posting in the inverted list.

36. The article of claim 24, wherein for each inverted list, if the number of postings exceeds x, further including a skip entry after the last posting in the inverted list.

37. An article comprising a machine-readable medium storing instructions operable to cause one or more machines to perform operations comprising:
receiving a collection of documents, each document comprising one or more index terms;
determining a first value x representative for inserting a first location of a first skip entry in an inverted index, wherein at least a majority of the index terms occur within x documents and x is an integer in a first range of 256 to 512, wherein the first value x representing the first location for inserting the first skip entry is not the first posting of the inverted index;
determining a second value y representative for inserting a second location of a second skip entry in the inverted index, wherein y does not exceed the value x and is an integer in a second range of 128 to 256; and
generating the inverted index for the collection of documents, the inverted index including an inverted list for each of the index terms, each inverted list including at least one posting and, if the number of postings exceeds x, further including the first skip entry inserted after the $x^{th}$ posting and one or more second skip entries inserted thereafter at intervals of every $y^{th}$ posting, wherein y does not equal x, such that the first and second skip entries are provided at different intervals;
wherein:
the at least one posting includes a document identifier identifying a document in the collection of documents;
the first and second skip entries include a document identifier that is included in a boundary posting of a block of postings immediately adjacent to the skip entry in the inverted list, where a block of postings includes postings having document identifiers ranging from a lower to an upper value and where a boundary posting is a posting having a document identifier of either the lower or the upper value.

38. The article of claim 37, wherein each posting further includes a position identifier identifying a position of the index term in the document, and a frequency of the index term occurring in the document.

39. The article of claim 37, wherein the boundary posting includes a document identifier having the lower value in the range of values and the block of postings follow the first skip entry in the inverted list.

40. The article of claim 39, wherein the first skip entry further includes information to locate the next skip entry in the inverted list.

41. The article of claim 37, wherein the boundary posting includes a document identifier having the higher value in the range of values and the block of postings precede the first skip entry in the inverted list.

42. The article of claim 37, wherein the first skip entry further includes information to locate the next skip entry in the inverted list.

43. The article of claim 37, wherein substantially all of the index terms occur in x documents or fewer.

44. The article of claim 43, wherein approximately 80 to 90% of the index terms occur in x documents or fewer.

45. The article of claim 37, wherein for each inverted list, if the number of postings exceeds x, further including a skip entry before the first posting in the inverted list.

46. The article of claim 37, wherein for each inverted list, if the number of postings exceeds x, further including a skip entry after the last posting in the inverted list.

* * * * *